No. 892,085. PATENTED JUNE 30, 1908.
J. H. RESE.
APPARATUS FOR MAKING BOTTLE CAPS OR STOPPERS.
APPLICATION FILED SEPT. 19, 1907.
2 SHEETS—SHEET 2.
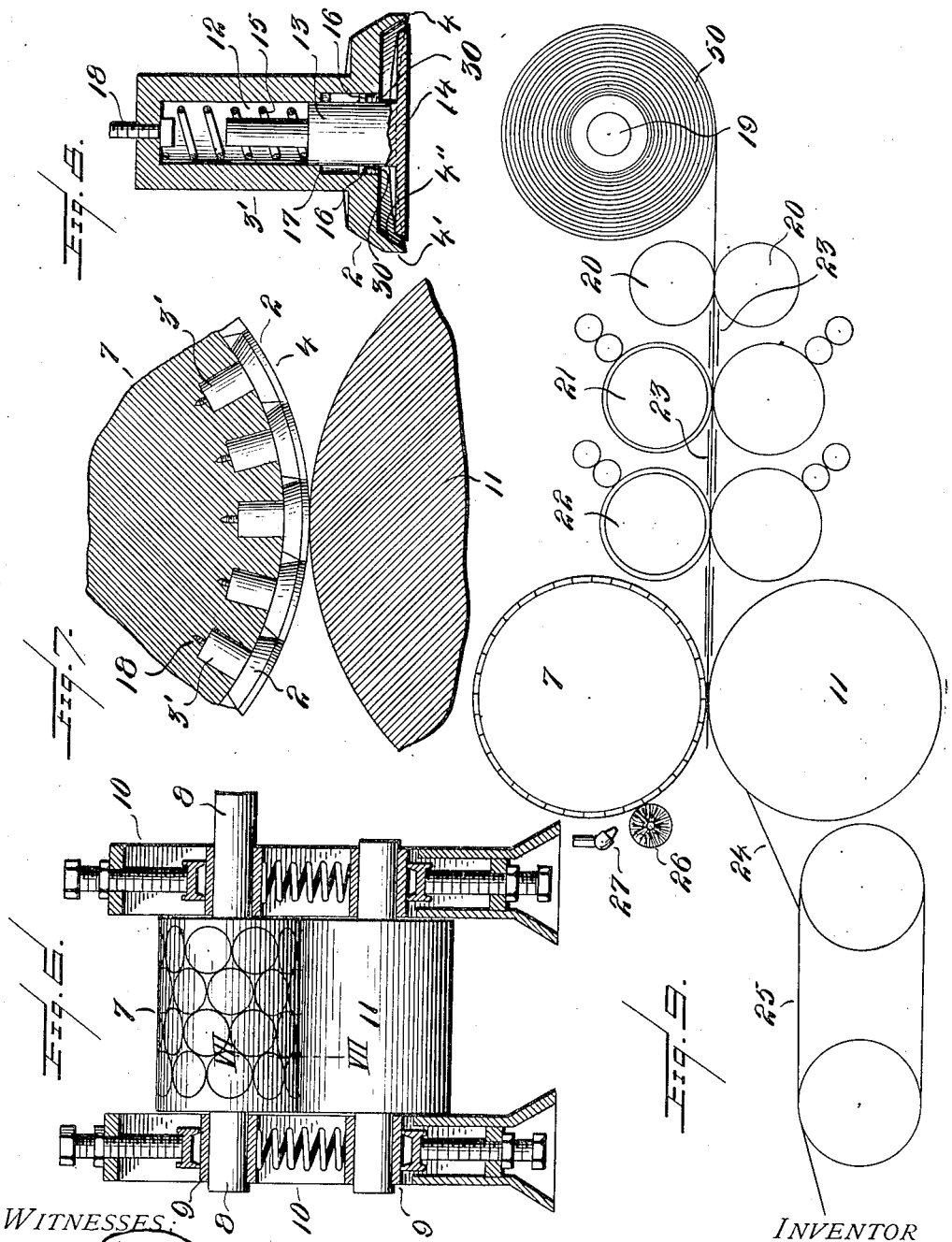
WITNESSES:
INVENTOR
John H. Rese
BY
J. S. Barker
his Attorney

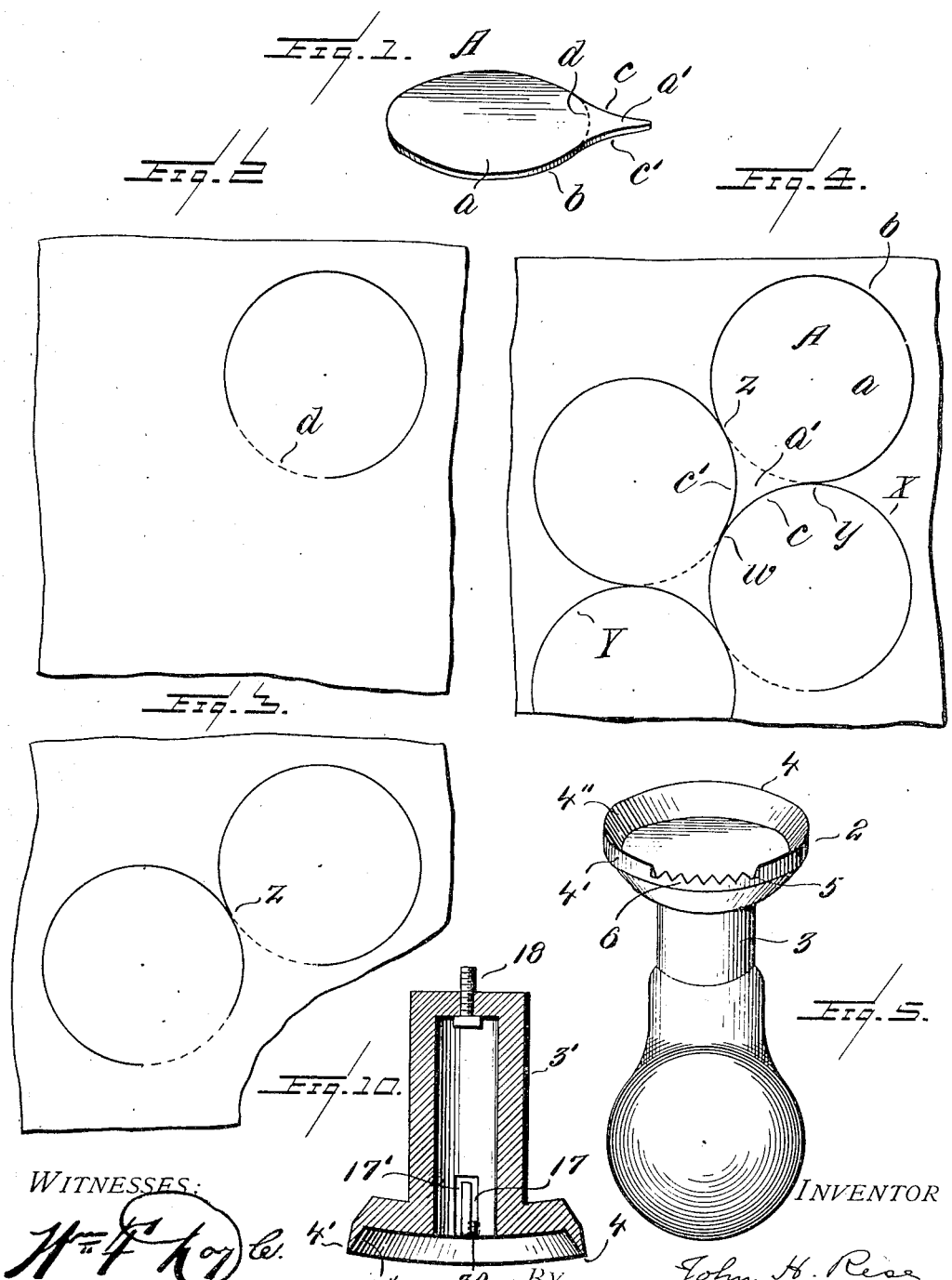

UNITED STATES PATENT OFFICE.

JOHN H. RESE, OF WASHINGTON, DISTRICT OF COLUMBIA.

APPARATUS FOR MAKING BOTTLE CAPS OR STOPPERS.

No. 892,085.　　　　Specification of Letters Patent.　　Patented June 30, 1908.

Application filed September 19, 1907. Serial No. 393,719.

*To all whom it may concern:*

Be it known that I, JOHN H. RESE, a citizen of the United States, residing at Washington, in the District of Columbia, have invented new and useful Improvements in Apparatus for Making Bottle Caps or Stoppers, of which the following is a specification.

My invention relates to apparatus for producing closures, caps or stoppers for bottles, jars and the like, the object of the invention being particularly to produce apparatus for the rapid and economical manufacture of paper stoppers for milk bottles.

In the accompanying drawings, Figure 1 is a perspective view of one of the stoppers produced by the apparatus herein illustrated and described. Figs. 2, 3, and 4 are diagrams illustrating the method of cutting out stoppers like that shown in Fig. 1. Fig. 5 is a perspective view of a hand die or cutter for making the stoppers. Fig. 6 is an end view of a power machine embodying my invention. Fig. 7 is a vertical section on the line VII—VII. Fig. 8 is a vertical sectional view enlarged of a preferred form of die or cutter adapted to be used in a power machine. Fig. 9 is a diagram illustrating in side elevation, a mechanism for producing stoppers, embodying my invention. Fig. 10 is a vertical section of the die or cutter represented in Fig. 8, the plane on which the section is taken being at right angles to that of Fig. 8.

In Fig. 1, I have illustrated a stopper or closure produced by a machine or device embodying my invention. Such an article I have described and claimed in my application Number 393,720 filed September 19th 1907. It is represented as a whole by A, and comprises a body portion $a$ which is in the form of a circular disk having extending from its edge a tab $a'$. The peripheral edge $b$ of the stopper is circular except for the break that occurs where the tab joins the body. The opposite edges $c\ c'$ of the tab are curved, each curve being reversed as compared with the curve of the edge $b$ and flowing or springing therefrom. The radii of the curves $b$, $c$ and $c'$ are of equal length. A stopper such as described may be produced by the use of a cutting tool of exceedingly simple construction, such as represented in Fig. 5. 2 indicates the head of the die or cutter carried by a stem 3 of suitable size and shape. The head is provided with a circular cutting edge 4, the outer face $4'$ of which is preferably cylindrical, while the inner face $4''$ is inclined or beveled, as indicated in Figs. 8 and 10. This shaping of the cutting edge of the die results in producing a slight bevel or curve along the seating edge of the closure or stopper cut thereby, which is desirable, and also allows a plurality of dies being so arranged that they may cut close one to the other. There is a gap 5 in the cutting edge of the die, the width of which is equal to the radius of the curve $b$, and the distance between the points where the two curves $c\ c'$, bounding the tab, spring from the edge, $b$, of the body.

The tool or die just described being of very simple construction may be cut without the use of complicated mechanism and yet by it may be produced the article shown in Fig. 1 having the peculiar contour there delineated. I will briefly describe how this may be done supposing a single hand die like that shown in Fig. 5 is employed.

In Fig. 2 is represented the first cut made by the tool, it being in shape a broken circle. In Fig. 3 I have indicated the second cut in its relation to the first. It will be observed that the two cuts join at the point $z$ which is located at one end of the break in the first-formed cut.

In Fig. 4 X and Y indicate respectively the third and fourth cuts made by the die. The third cut joins the first at the point $y$ which is located at the end of the break in the first cut opposite the point $z$; and joins the second cut at the point $w$, which is located at one end of the break in the second cut. It will be observed that the second and third cuts not only sever the body portions of two disks, but also complete the formation of the tab of the disk or stopper, the body of which was produced by the first cut, and that the third and fourth cuts complete the tab of the disk, the body of which was produced by the second cut. This method of cutting out the stoppers may be carried on indefinitely, and it is apparent from the diagram just referred to that when the tool is thus used there is very little waste of the stock material.

The die may be constructed to score or indent the material of the stopper along the line $d$, Fig. 1, so that the tab may be easily turned up when inserted into a bottle neck. For this purpose a scoring or indenting ridge 6 is provided across the gap 5, such ridge being, of course, lower than the cutting edge 2.

It is one of the objects of my invention to produce a machine that will carry cutters embodying the features of the die already described, and will continuously, accurately and quickly produce cuts in the stock material in the relations to each that have been set forth so as to utilize to the fullest extent possible the stock material, and produce bottle stoppers or caps such as represented in Fig. 1.

In order to rapidly and economically produce the stoppers or caps, a number of dies having the characteristics of the one represented in Fig. 5 are assembled in a suitable holder. I prefer that such holder should be approximately cylindrical in shape as represented in Figs. 6 and 7.

Referring to Fig. 6, 7 represents a cylinder having a supporting shaft or gudgeons 8, the latter being mounted in bearings 9 supported in frame-pieces 10—10. 11 represents a cylinder opposed to the cylinder 7 and also suitably mounted in the frame. The manner of mounting these cylinders, and the construction of the frame parts, bearings, adjusting devices, springs for holding the rolls together, etc., need not be illustrated or described in detail herein, as they may be of any usual or preferred construction. In the roll 7 are formed a series of recesses adapted to receive the stems 3' of the cutting dies. The dies are arranged as indicated in Figs. 6 and 7 in close proximity to each other and so that they will produce cuts from the stock material upon which they act as indicated in Fig. 4. The die or abutment upon which the sheet of material rests when the cutting dies are acting thereon, consists of the roller 11 which is of true cylindrical form and is composed of some relatively soft substance such as copper, brass or fiber so as not to injure the cutting edges of the dies, should they come in contact therewith.

In order to prevent the stoppers that are cut by the dies from sticking in the latter, I prefer to provide each die with an automatically-acting ejector which may be of the form and construction indicated in Fig. 8. As there illustrated the stem of each die is formed with a longitudinal central recess 12, into which extends the stem 13 of a disk-shaped ejecting head or plunger 14 that lies in the cavity formed by the cutting edge 4. A spring 15 is seated in the cavity 12 and acts to force the ejector outward so that the face of the plunger 14 normally stands about flush with the cutting edge 4. Stop pins 16 moving in suitable ways 17 formed in the inner wall of the stem 3 serve to direct and limit the movements of the plunger or ejector. 18 indicates a screw by which the cutting die may be secured to the carrying cylinder 7. It will be apparent that if a sheet of cardboard or paper be passed between the rolls, they being in rotation and held toward each other with sufficient force, the dies will successively act upon and cut the paper and the plungers will be forced inward during the cutting operations. As soon, however, as a die passes from the engagement with or in opposition to the abutment roller 11, the spring 15 forces the ejector outward and the cut stopper is discharged.

In Fig. 9, I have represented an automatic apparatus for making milk bottle stoppers. Referring to this view, 19 represents a shaft or beam upon which is mounted the roll of paper 50 from which the stoppers are produced. 20, 20 indicate feed rolls, 21, printing mechanism which may print upon one or both sides of the paper, and 22, coating apparatus for applying paraffin or other suitable material to the paper to render it moisture proof. These parts—the feeding mechanism, the printing apparatus, and the coating apparatus, may be of any usual or preferred construction, and I have for that reason indicated them diagrammatically only. 23, 23 represent guides for supporting and directing the paper from one part of the mechanism to another. After the paper has been printed and coated, it passes to the cutting apparatus, which may be a machine such as represented in Fig. 6. The stoppers or caps as they are produced are received upon an inclined delivery board 24 whence they pass to suitable conveying mechanism indicated at 25. In order to prevent the stoppers or scraps of paper from adhering to the cutting dies I employ a brush 26 having stiff bristles which is so mounted that it acts upon the cutting dies, as indicated in Fig. 8. The brush 26 may be supplemented by an air blast issuing from a pipe or nozzle located as at 27. These latter adjuncts may be employed or not as circumstances may require.

I prefer that the ways in which move the stop pins 16, should be constructed as illustrated in Fig. 10, that is to say, each way is substantially U-shaped, having two legs, 17 and 17', connected at their inner ends by a cross channel or way. The leg 17' of the way or guide is open at its outer end, while that at 17 is closed, preferably by a screw 30. In putting the plunger in place the pins 16 are caused to enter the legs 17' of the guides, and are moved down to the cross passages. The plunger is then slightly turned carrying the pins into the legs 17 of the guide, when the plunger may be released and the spring 15 allowed to force it out. The screws serve to confine the pins within the slots or ways 17, and being adjustable, may be employed to regulate the position which the plunger will normally occupy under the influence of the spring 15.

I do not wish to be confined to the particular showing of my invention made in the drawings hereof, as it is evident that other means for mounting and operating the dies than what is shown may be employed, as for instance, a reciprocating carrier for the cutters instead of a rotary one.

What I claim is:—

1. A cutter or die for producing tabbed stoppers or closures, having a circular cutting edge in which is formed a gap or blank space of a length corresponding with the radius of the circle of the cutting edge, substantially as set forth.

2. In an apparatus for cutting flat closures or stoppers, a holder or carrier and a plurality of cutters or dies mounted therein, each die having a circular cutting edge in which is formed a gap or blank space, the dies being arranged so that the cut formed by one touches tangentially the cuts formed by adjacent dies, and the gap in the cutting edge of each die being situated opposite to the cutting edge of two adjacent dies.

3. In a machine for cutting thin stoppers or closures, the combination of a cylindrical carrier, a plurality of cutting dies mounted therein, the dies being set close to each other, as described, and each having a circular cutting edge having formed therein a blank or gap equal in length to the radius of the circle of the cutting edge, and a circular abutment against which the dies act, substantially as set forth.

4. In apparatus for cutting closures or stoppers, the combination of a carrier, a plurality of cutting dies mounted therein, each die having a circular cutting edge in which is formed a gap or blank space, the dies being set close to each other so that the cut formed by one touches the cut formed by adjacent dies, and the cutting rim or edge of each die being beveted on its inner side and straight on its outer side, substantially as set forth.

5. A cutting die for making closures or stoppers comprising a sharp cutting rim and a hollow stem, in the inner wall of which latter is formed a guiding groove of substantially U-shape, the legs being open at their outer ends and one of them screw-threaded, in combination with an ejector arranged within the cutting rim and having a shank or stem that enters the hollow stem of the cutting die, and provided with a pin adapted to enter the said guiding groove, a spring for forcing the ejector outward, and a screw arranged to be inserted into the screw-threaded leg of the guiding groove and by its adjustment to limit the position to which the plunger is moved outward by the spring, substantially as set forth.

JOHN H. RESE.

Witnesses:
 GEO. B. PITTS,
 L. C. BRADY.